J. H. AND S. M. CARMEAN.
ELECTRIC HEATER.
APPLICATION FILED AUG. 5, 1918.
1,313,258.
Patented Aug. 19, 1919.
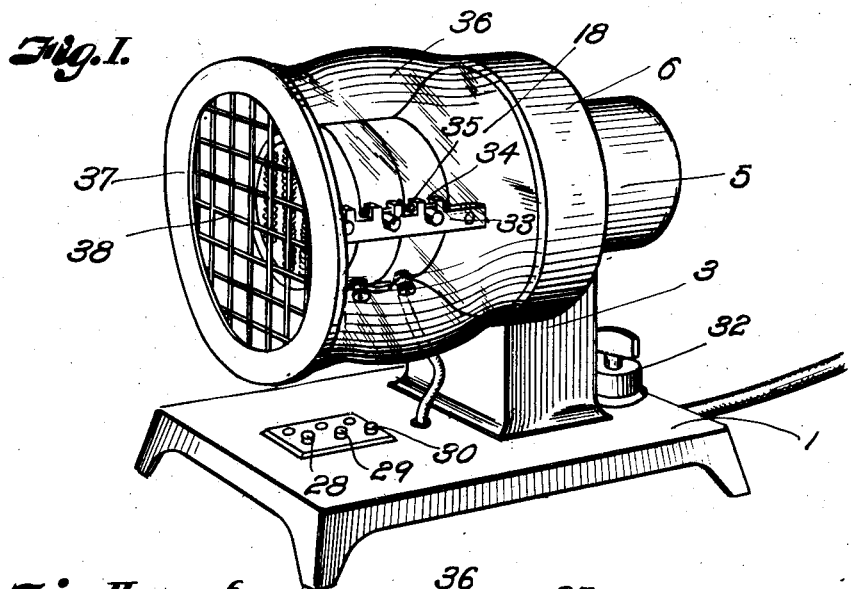
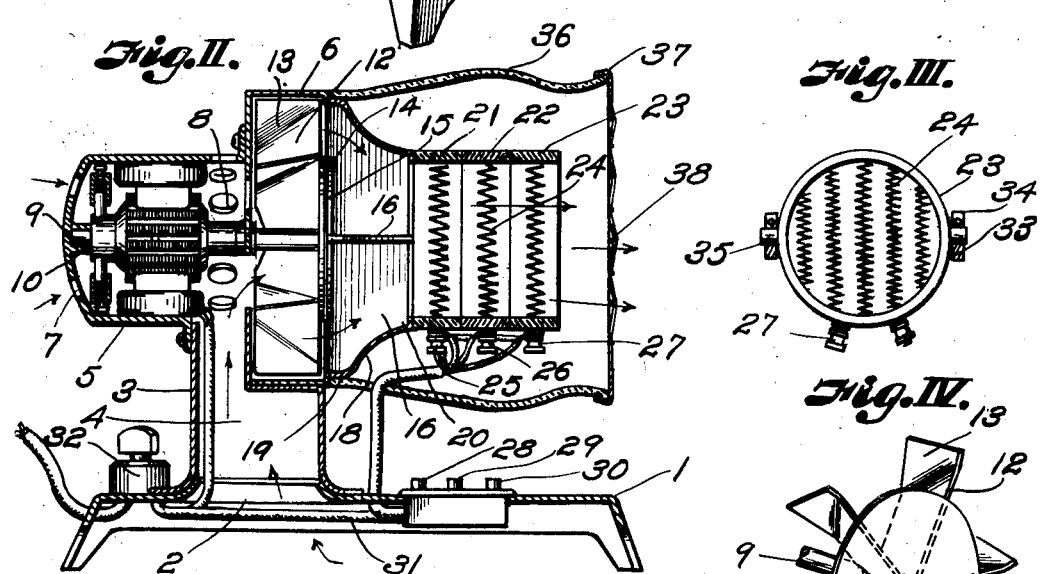
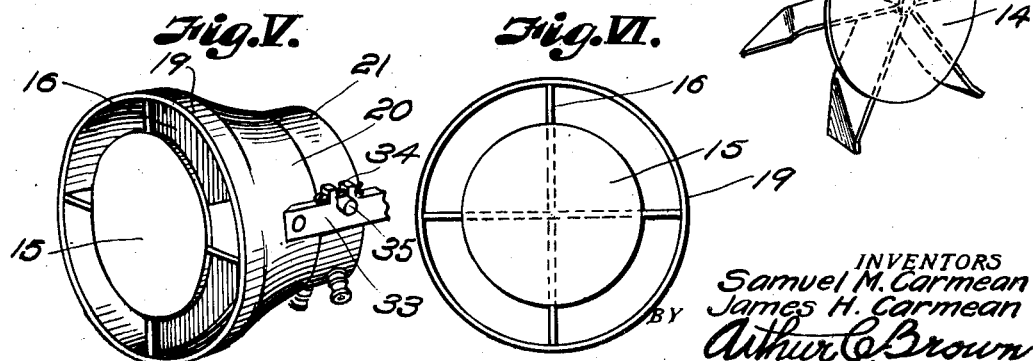
INVENTORS
Samuel M. Carmean
James H. Carmean
BY Arthur C Brown
ATTORNEY

UNITED STATES PATENT OFFICE.

JAMES H. CARMEAN AND SAMUEL M. CARMEAN, OF KANSAS CITY, MISSOURI.

ELECTRIC HEATER.

1,313,258.  Specification of Letters Patent.  Patented Aug. 19, 1919.

Application filed August 5, 1918. Serial No. 248,447.

*To all whom it may concern:*

Be it known that we, JAMES H. CARMEAN and SAMUEL M. CARMEAN, citizens of the United States, residing at Kansas City, in the county of Jackson and State of Missouri, have invented certain new and useful Improvements in Electric Heaters; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to electrical heating devices and particularly to a device for effecting a circulation and heating of the air in a room so as to raise the temperature of the surrounding atmosphere.

The primary object of the invention is to provide an electrically controlled heating device whereby the cooler air of the room may pass through the device to be heated and be instantly circulated to raise the temperature of the room to the desired degree without any appreciable loss of heat energy.

The invention consists broadly in providing a motor driven fan or air pump adapted to direct a flow of air into contact with a heating element or elements so as to raise the temperature of the air, together with means for arresting the velocity of the air from the fan and discharging it in a symmetrical stream so as to cause uniform heating of the stream throughout, thereby avoiding the loss of the heat generated in the heater and at the same time providing an equal distribution of the heated air to co-mingle with the surrounding atmosphere.

In carrying out our invention we have provided means whereby the heater may be constructed in a simple, efficient and durable manner, well calculated to serve the purpose for which it is intended.

Among the manifold advantages of our invention is the provision of means whereby air may be passed over the commutator and armature of the motor to cool it, said air being then directed through the fan and over the heating coils in a pre-heated condition, due to the fact that heat absorbed from the armature and commutator is available to raise the temperature of the air before it comes in contact with the heating element especially designed to supply the major portion of the heat.

In devices of the class described, it is desirable that the stream or column of heated air issuing from the heating device be of uniform density throughout, so that there will be an equal distribution of the issuing stream to co-mingle with the surrounding atmosphere and so that the heated stream may be directed along a given line.

Where a centrifugal fan is employed, the air passes from the fan with a whirling motion due partly to the velocity imparted thereto by the fan blade and in part to the construction of the fan blade and unless some means is provided for controlling the air issuing from the fan, the direction of its travel is extremely difficult to determine.

We have also provided means whereby the heating member may be constructed of sections, each section being independently controlled and thereby making it possible to vary the quantity of heat supplied at any one time.

We have also provided means whereby the heater may be constructed with a maximum capacity confined in a relatively small space with the parts so constructed that they may be readily assembled or dissociated as the occasion may demand.

In the drawings:

Figure I is a perspective view of the heater constructed in accordance with our invention.

Fig. II is a vertical longitudinal sectional view throughout the same.

Fig. III is an end view of one of the heating elements.

Fig. IV is a perspective view of the fan or air impeller.

Fig. V is a perspective view of the device for arresting the velocity of the air issuing from the impeller.

Fig. VI is an end view of the same.

In carrying out our invention we may employ a base 1 provided with an air inlet opening 2, communicating with a hollow standard 3 having an air space 4 therein. The hollow standard 3 supports a motor casing 5 and a fan housing 6. The motor casing 5 is provided with end air inlet openings 7 and additional air inlet openings 8, substantially in line with the space 4 in the hollow standard 3. The shaft 9 of the motor is journaled in bearings 10 and 11 and carries an air impeller or fan comprising radial blades 12, having their tips bent slightly forward as at 13 to direct the air in a forward direction. 14 is a disk or end baffle connected to the outer edges of the fan blades as clearly shown in Fig. IV. The baffle 14 is preferably of substantially the same diameter as the disk or baffle 15 connected to the baffle plates or blades 16 in the air directing chamber formed by the frusto-conical casing 18, the end 19 of which is substantially the same diameter as the fan casing and the end 20 of which is of less diameter as clearly shown in Figs. II and V.

The baffle plates or blades 16, extend longitudinally of the casing 18 and tend to cut down the velocity of the air issuing from the impeller or fan, and in conjunction with the casing 18 to direct the air onto the heating elements. The heating element may consist of separate units which are designated 21, 22 and 23, in the form of rings which being provided with suitable heating filaments 24 connected through separate binding posts 25—26 and 27 to the switches 28—29 and 30, said switches being supplied from a suitable feed wire 31 connected to a suitable source of the current not shown. The switch 32 in the line is adapted to permit the motor to be energized and at the same time cut in the wire 32 so that the heaters may be switched on if desired. It may be here stated that the impeller may be operated without energizing the heating elements in the event that it is desired to circulate the air without heating it, and for that reason we have found it expedient to so arrange the device that the impeller may be operated independently of any of the heating elements. The heating elements as shown, may be supported from side bars 33 carried by the casing 18, the side bars being provided with notches 34 to receive pins 35 projecting from the rings 21—22 and 23 respectively.

In order to protect the occupant of the room from contact with the heating elements and further to reflect the heat therefrom, we have provided a hood or reflector 36 which may be secured to the fan casing and which is provided with a flange or rim 37 carrying a grid or screen 38. The reflector 36 preferably increases from its inlet toward its outlet and is of such form that it may assist in directing the air in a uniform stream. The reflector may be either transparent, opaque or translucent, according to the desire of the user.

Having thus described our invention what we claim as new therein, and desire to secure by Letters-Patent, is:

1. In a heating device, a casing an electrical heating means in the casing, an air impeller, a motor for driving the impeller, and means for directing the air in a stream of substantially uniform density throughout a zone in which the heating elements are located, said means comprising a group of flat blades in axial alinement with the impeller and with the heating means and a frusto-conical casing surrounding said group of blades.

2. In a heating device a base, a hollow standard on the base and communicating with an opening therein, a vertically arranged impeller the casing of which communicates with the hollow standard, a chamber communicating with the impeller casing, means in the chamber for retarding the velocity of the air delivered by the impeller and heating elements in the path of air delivered from the chamber.

3. In a heating device, a support, a hollow standard on said support having openings at its respective ends, an impeller having a casing in communication with the standard whereby outside atmosphere may flow through the openings in the standard into the casing, heating elements and velocity retarding means between the heating elements and the impeller.

4. In a heating device, a support, an air impeller carried by the support, radial, stationary blades in front of the air impeller for retarding the velocity of the air delivered by the impeller, electro-heating means, and means for energizing the heating means.

5. In a heating device, a support, an air impeller carried by the support consisting of motor-driven, radial blades, a disk connected with the front end of said blades, a plurality of stationary blades in front of the impeller, a disk connecting the rear ends of said stationary blades, the disk on the stationary blades and the disk on the impeller blades being parallel to and in close proximity one with the other, heating elements in front of the stationary blades and in the path of air discharged through them, and means for energizing the heating elements.

6. In a heating device, a support, an air impeller carried by the support, a casing, part of which surrounds the impeller, radial stationary blades in front of the impeller and within the casing, a housing surrounding the tips of the radial blades, said housing being in the form of the frustum of a cone, and heating elements carried by the housing.

In testimony whereof we affix our signatures.

JAMES H. CARMEAN.
SAMUEL M. CARMEAN.